Dec. 28, 1943.                    A. MORCH                    2,338,005
                                 POWER PLANT
                            Filed March 20, 1942          3 Sheets-Sheet 1

Inventor
Anthony Morch.
By
John E. Baug.
Attorney

Dec. 28, 1943.  A. MORCH  2,338,005
POWER PLANT
Filed March 20, 1942  3 Sheets-Sheet 2
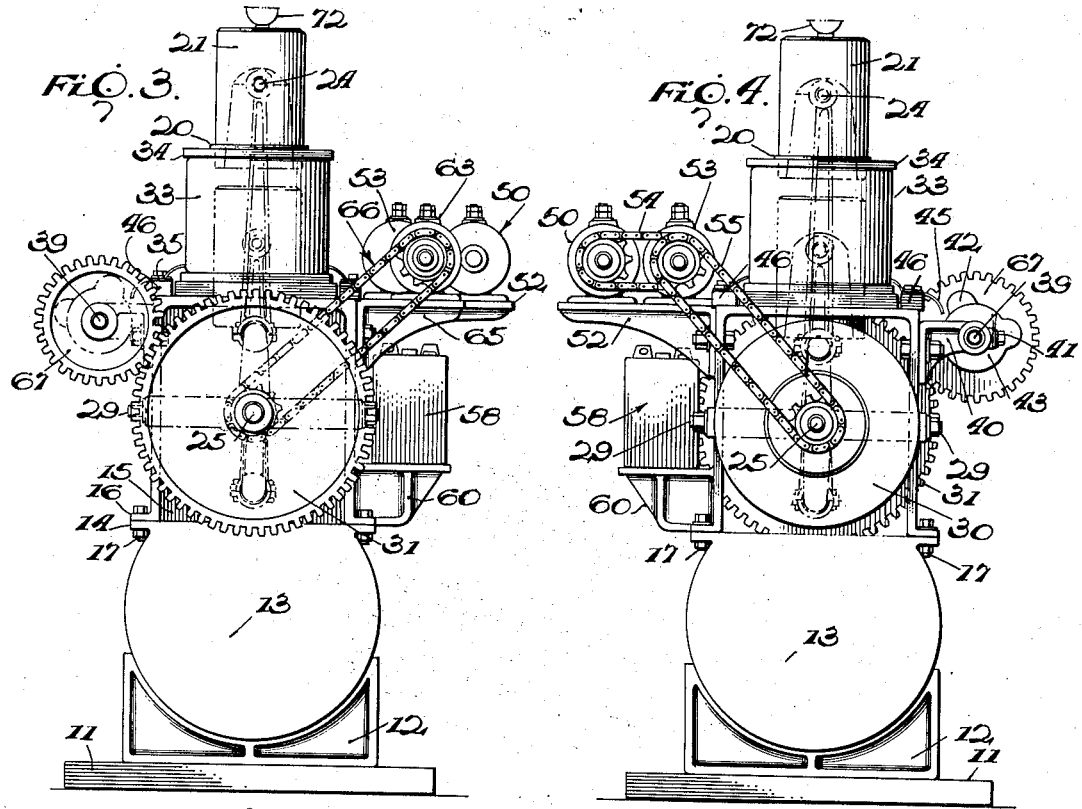
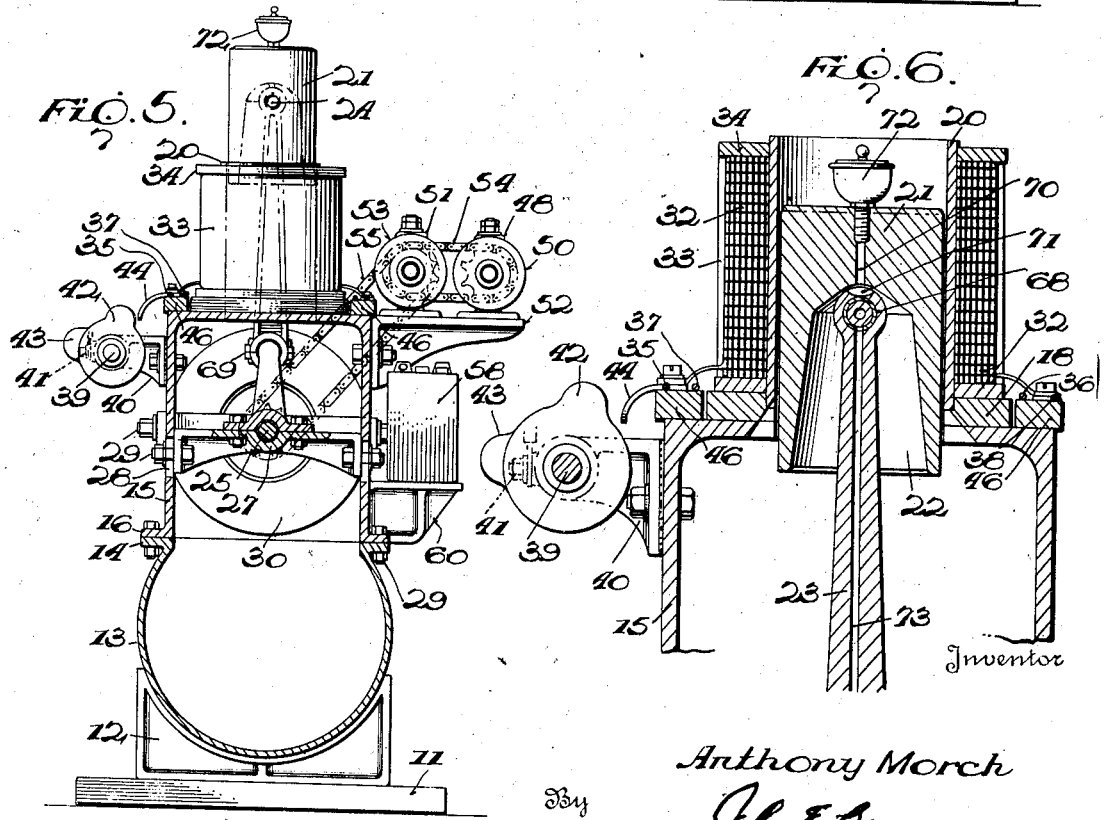
Inventor
Anthony Morch
By
John F. Sauge
Attorney

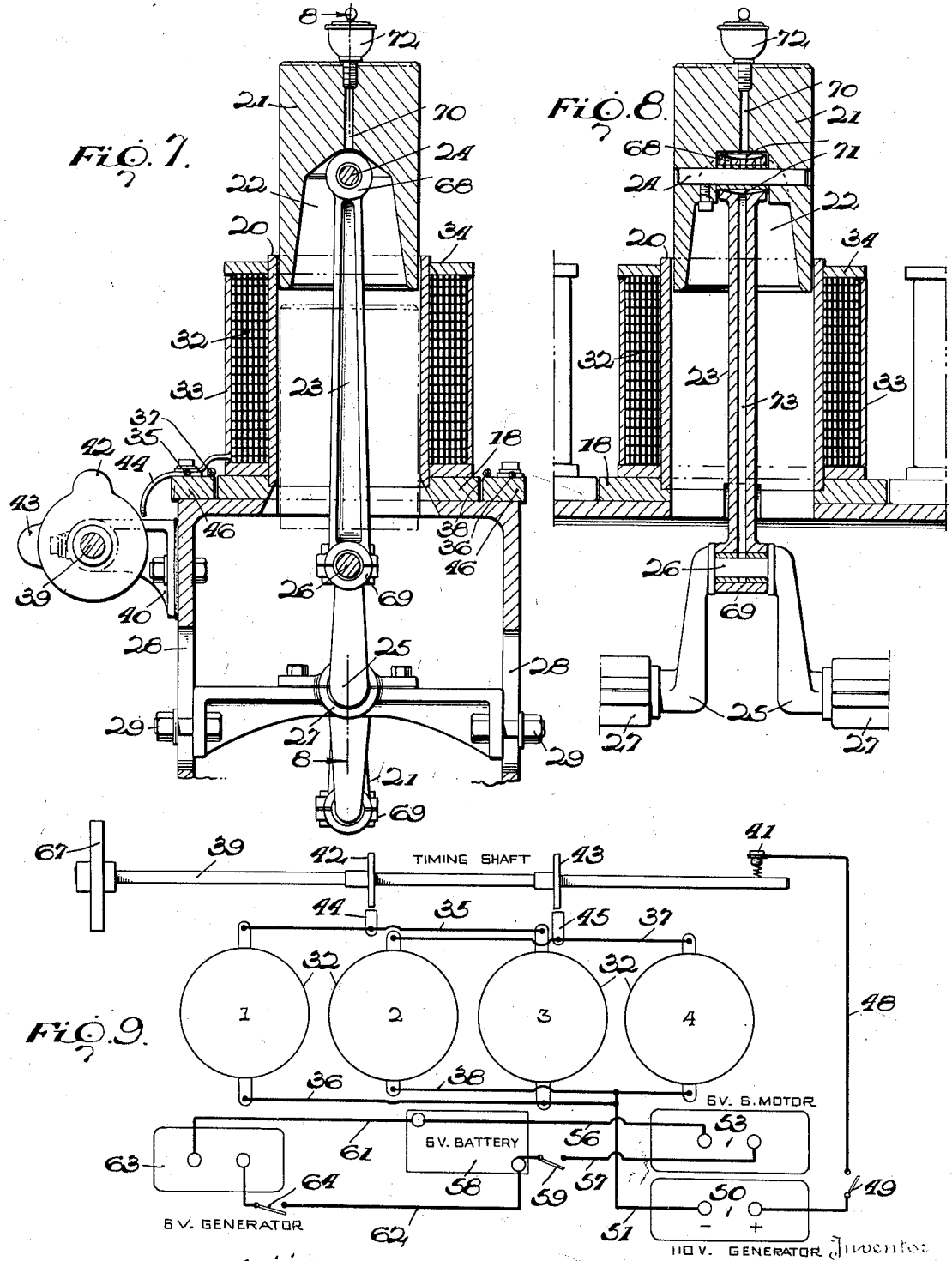

Patented Dec. 28, 1943

2,338,005

UNITED STATES PATENT OFFICE 2,338,005

POWER PLANT

Anthony Morch, Brooklyn, N. Y., assignor of one-half to John Morch, Jamaica, N. Y.

Application March 20, 1942, Serial No. 435,584

1 Claim. (Cl. 172—126)

The invention relates to power plants generally and more particularly to an electro-mechanical type of the same for the generation, conversion, and transmission of power.

An object of the invention is to provide a power plant of the class as above specified, and one that is designed to function as a prime mover of more or less general application; its instrumentalities and mechanisms cooperating to generate electrical energy and convert the same to mechanical energy which is derived from the rectilinear motion of a reciprocating element, or elements, actuated by the electrical energy, and subsequently converting the rectilinear motion into rotary motion, for the delivery of the developed mechanical power to load.

Another object of the invention resides in the provision of a prime mover or power converter of the kind mentioned, and one that is in the nature of an electric engine, wherein the rectilinear motion of the piston-like cores or plungers of a plurality of solenoidal magnets is transferred, through suitable oscillatory connections, i. e., connecting rods or the like, to a rotary element, i. e., a crank-shaft or the like, for the delivery of the power developed at the crank-shaft to load.

With these and other objects of equal importance in view, the invention resides in the certain new and useful combination, construction, and arrangement of instrumentalities, mechanisms, and parts, as will be hereinafter more fully described, set forth in the appended claim, and illustrated in the accompanying drawings, in which:

Figure 3 is a rear end elevation;

Figure 4 is a front end elevation;

Figure 5 is a vertical, transverse section, taken on the line 5—5 of Figure 1;

Figure 6 is an enlarged, fragmentary, vertical, transverse section, taken on the line 6—6 of Figure 7;

Figure 7 is a view somewhat similar to that of Figure 6, but taken on the line 7—7 of Figure 1;

Figure 8 is an enlarged, fragmentary, vertical, longitudinal section, taken on the line 8—8 of Figure 5;

Figure 9 is a diagrammatical plan view of the electrical instrumentalities and the circuit connections thereof; and, Figure 10 is an enlarged, fragmentary, sectional detail, showing the installation of a brush-contact in one of the bearing brackets for the timing shaft of the circuit closer for controlling the sequential energizing of the windings of the solenoidal magnets.

Figure 1:
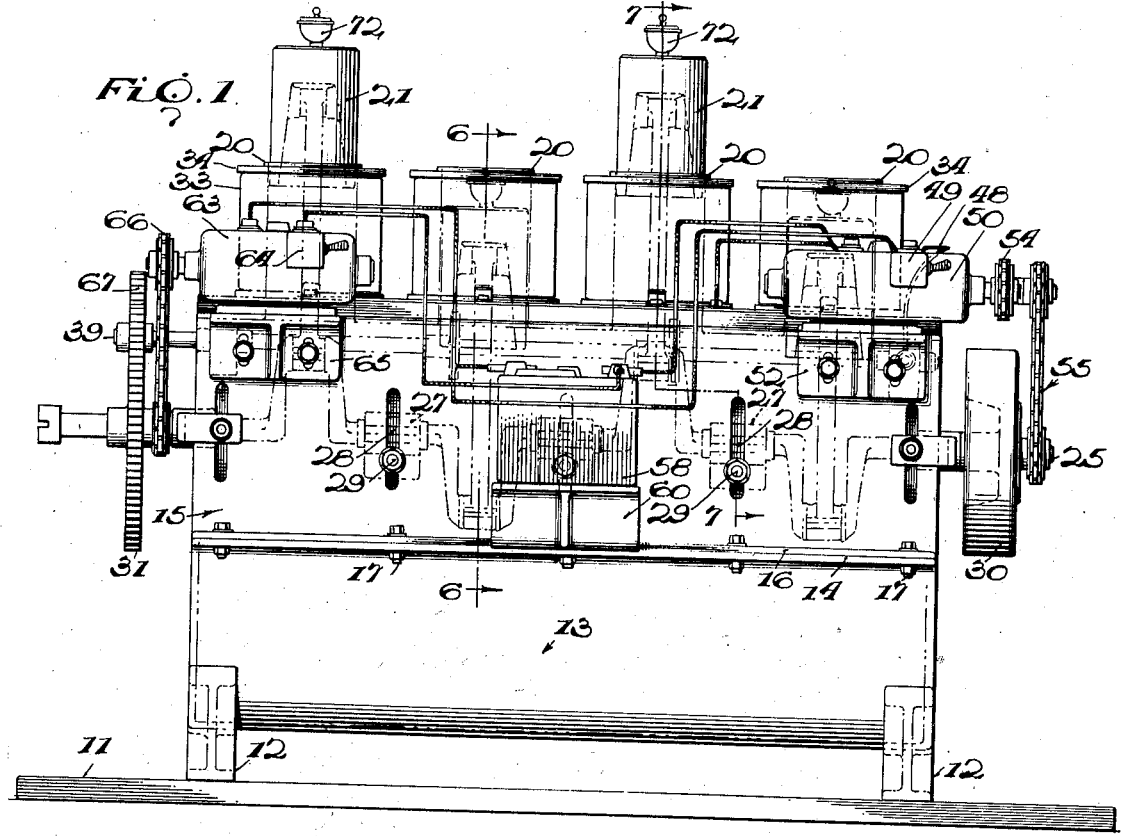
Figure 1 is a side elevation of a preferred embodiment of the power plant, in accordance with the invention.

Referring to the drawings, wherein like characters of reference denote corresponding parts, mechanisms, and instrumentalities, throughout the several views thereof, the invention, as is exemplified therein, is generally comprised in a mounting for a series of solenoidal magnets, which are, preferably, disposed in the vertical and in line after the manner of the cylinder and piston units of certain types of steam and internal combustion engines, and have their movable cores, i. e. pistons, interconnected with a single rotary element, that may take the form of a crank-shaft, to convert the rectilinear, i. e. reciprocating, motion of the pistons into rotary motion for the delivery of the developed power from the crank-shaft to a load.

The electrical equipment for effecting the operation of the reciprocatory-rotary mechanism so constituted is comprised in a high voltage D. C. generator for supplying electric current to the windings of the solenoidal magnets, in a sequential order of operation of the piston-cores thereof; a low voltage D. C. starting motor for placing the crank-shaft and the rotor of the high voltage generator in motion simultaneously; a storage battery of the same voltage requirement for supplying current to the starting motor; and a D. C. generator of the same low voltage for keeping the storage battery on charge, as required. The starting motor has its rotor in driving connection with both the rotor of the high voltage generator and the crank-shaft at all times, but it may be disconnected from the storage battery following the initial operative motion of the reciprocatory-rotary mechanism, which will thereafter drive both the low and high voltage generators through operative connections of their respective rotors with the crank-shaft, as well as deliver surplus power to a load to which the latter may be operatively connected at the moment.

As illustrated, and more specifically, the invention is comprised in a base 11 having vertically offset parts 12 arranged in spaced relation thereon to cradle the opposite ends of a lower casing part 13, which is substantially cylindrical or trough-like in form and has flanges 14 out-turned from the side edges of its open top. An upper casing part 15, that is substantially rectangular in both its longitudinal and transverse dimensions, is supported on the lower casing part 13 and, to such end, is open at its lower side and has the side edges of the opening angularly bent to provide out-turned flanges 16, corresponding to the flanges 14, to which they are secured by bolts or the like 17. The body or frame so constituted thus presents an appearance closely approximating that of a standard automotive engine, the lower casing part 13 simulating the crankcase portion and the upper casing part 15 the cylinder block of that type of engine.

Supported on the top side of the upper casing part 15 are several solenoidal magnets, forming cylinder and piston units (four being shown for the purposes of the present description), each of which is separately made up of a substantially rectangular base 18, in the nature of a block or plate of a suitable insulating material, such as hard fiber or the like, having a circular open center into which the lower end of a cylinder 20 is fitted and secured. The cylinder 20 is made from a suitable non-magnetic metal, such as brass or the like, in tube form and open at both of its ends, and has its lower end opening through the base and centered over an opening formed in the top wall of the upper casing part 15. Mounted within the cylinder 20 is a piston 21, in the form of a cylindrical mass of a magnetic material, preferably iron of high permeability to magnetic flux, which has its lower end provided with a recess 22 to receive the upper end of a connecting rod 23, that is coupled to the piston by a wrist-pin 24 and, at its lower end, to a crank-shaft 25 by a crank-pin 26, substantially as is shown in Figures 7 and 8.

In assembly, the cylinder and piston units, or solenoidal magnets, will be emplaced in line upon the top wall of the upper casing part 15, with their bases 18 arranged in substantially edge to edge abutting relation, for securement to that wall by means of bolts or the like 19. The crank-shaft 25 is provided with a crank supported crank-pin 26 for each of the connecting rods 23 and is supported in bearings 27 that are equidistantly spaced along the length of the upper casing part 15, so as to engage the shaft at points between the cranks and at its opposite ends. These bearings 27 are supported transversely of the interior of the upper casing part 15 from its side walls, which are provided with vertical slots 28 to receive bolts or the like 29 for securing the opposite ends of the bearings and to permit of compensating adjustments thereto. The opposite ends of the crank-shaft 25 are projected from the outermost of the bearings 27, which are preferably spaced outwardly from the adjacent open ends of the upper casing part 15, and one of these shaft ends, preferably the front end, carries a fly wheel 30, and the other, or rear end, a gear 31. Beyond the gear 31, the shaft end will also be provided with any suitable form of power takeoff (not shown).

Each of the cylinders 20 is encircled by a winding 32 that is made from a magnet wire of suitable gage and enclosed within a protective covering or housing 33 having end pieces 34. These windings 32, in the order of the alined arrangement of the cylinder and piston units, or solenoidal magnets, from left to right as shown in Figures 8 and 9, are electrically connected in a manner to be energized in pairs from a current source; the terminals at one side of the first and third of the windings by a conductor 35 and those at the opposite sides by a conductor 36, and the terminals at one side of the second and fourth of the windings by a conductor 37 and those at the other sides by a conductor 38.

Figure 2:
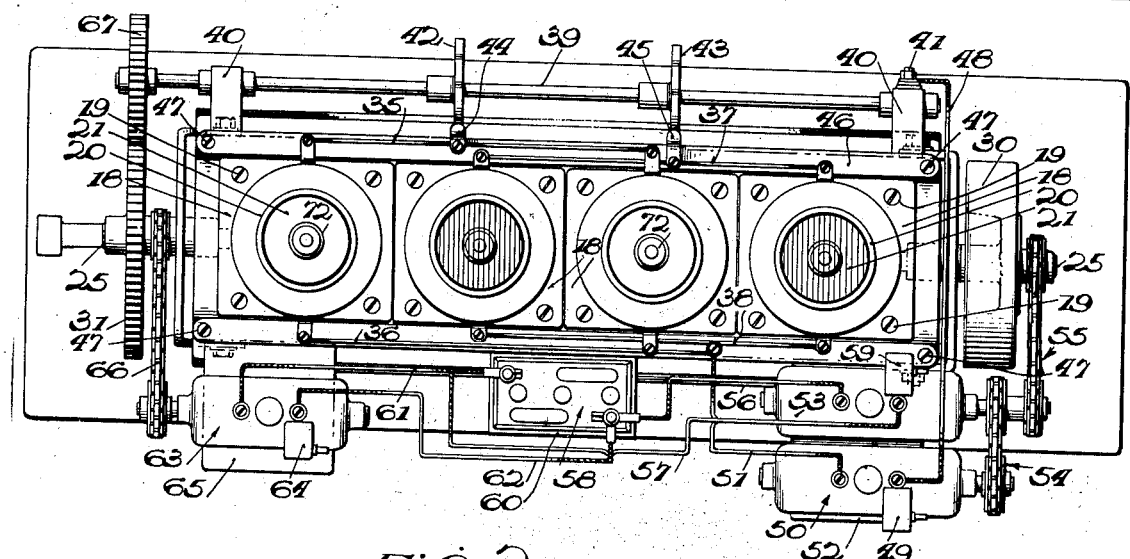
Figure 2 is a top plan view.

To effect the required sequential energizing of the pairs of the windings 32, a timing mechanism is provided, and it is comprised in a shaft 39 that is journalled in suitable bearings carried in supporting brackets 40, which are bolted at one side of the upper casing part 15, and is insulated thereto in order that current impressed on the shaft 39, at a circuit terminal contact carried by one of the brackets 40, will not be grounded through the casing parts. Mounted on the shaft 39 and rotatable therewith is a pair of contact elements 42 and 43, of cam-like form, which are arranged to cooperate with a pair of stationary contacts 44 and 45, respectively, that may take the form of short lengths of spring metal supported from the top side of the upper casing part 15. These contacts 44 and 45 are in electrical connection with the conductors 35 and 37, respectively, connecting the terminals at the near sides of the aforesaid pairs of windings. The several terminals of the windings 32, the conductors 35, 36, 37, and 38, connecting these terminals, and the stationary contacts 44 and 45, are preferably carried on insulating strips 46 extending longitudinally of the side edges of the top wall of the upper casing part 15, alongside the adjacent edges of the several insulating bases 18 of the cylinder and piston units, the strips being secured to the casing wall by bolts or the like 47 (Figure 2).

The circuit terminal contact 41, of the timing shaft 39, is connected by a lead 48, through a control switch 49, to one terminal of the high voltage D. C. generator 50, which has its other terminal connected by a lead 51 commonly to the conductors 36 and 38 connecting the opposite terminals of the pairs of the windings 30. The generator 50 is supported on a substantially shelf-like bracket 52 that is secured on the side of the upper casing part 15 toward one end thereof and opposite that side on which the timing shaft 39 is mounted. Mounted upon the bracket 52, inwardly of the generator 50, is a low voltage D. C. motor 53, the rotor shaft of which is operatively connected to the rotor shaft of the generator 50 in suitable manner, as by a chain and sprocket mechanism 54, and also to the crank-shaft 25 by another chain and sprocket mechanism 55. Energy for the operation of the motor 53, which functions as a starter for imparting motion to both the crank-shaft 25 and the rotor of the generator 50, is supplied through leads 56 and 57 from a storage battery 58, the lead 57 preferably including a control switch 59. The storage battery 58 is supported on a bracket 60 mounted on the side of the upper casing part 15, preferably at a central point thereon as a matter of convenience, and has its terminals connected by leads 61 and 62 to the terminals of the low voltage D. C. generator 63, from which it receives a charging current as required; the lead 62 also including a control switch 64. The values of the potential outputs of the storage battery 58 and the generator 63, for instance, six (6 v.) volts, is, of course, identical to that of the input of the starting motor 53.

The generator 63 is supported on a bracket 65 that is mounted on the same side of the upper casing part 15 as are the brackets 52 and 60, but preferably toward the end thereof opposite from that on which the bracket 52 is secured, in order that the rotor shaft of the generator will be in a position for its operative connection to the crank-shaft 25 in suitable manner, as by the chain and sprocket mechanism 66. The timing shaft 39 is also to be operatively connected to the crank-shaft 25 and, to such end, is provided with a pinion 67 arranged in mesh with the gear 31; the pinion 67 being preferably fabricated from a non-metallic material, so as to further insulate the shaft 39 from ground.

For purposes of the present description of the invention, and with the values of the potential outputs of the storage battery 58 and the generator 63 and of the input of the starting motor 53 as before stated herein, namely, six (6 v.) volts, the value of the potential output of the generator 50 should be not less than one hundred ten (110 v.) volts for its application to the windings 32, and with the storage battery 58 charged, the operation of the power plant is as follows: With all of the control switches 49, 59, and 64, open, the switch 59 will be closed for the completion of the circuit between the starting motor 53 and the storage battery 58, through the leads 56 and 57. With the motor 53 thus placed in operation, the driving power developed at its rotor shaft will be immediately transmitted by the chain and sprocket mechanisms 54 and 55, respectively, to the rotor of the generator 50 and the crank-shaft 25. With the speeding up of the rotor of the generator 50 and of the crank-shaft 25, the control switch 49 will be closed between the generator 50 and the windings 32 of the cylinder and piston units and, at the same time, the control switch 59 may, if desired, be opened to disconnect the starting motor 53 from the storage battery 58. Also, at this time, the control switch 64 may be closed to complete the circuit between the storage battery 58 and the charging generator 63, through the leads 61 and 62. Upon the closing of the control switch 49, current will be delivered from a terminal of the generator 50 to the windings 32, for instance, through the switch 49 and the lead 48 to the terminal brush contact 41 and from the latter through the timing shaft 39 to the distributing contacts 42 and 43. Current from the distributing contact 42, in its rotation with the timing shaft 39, will pass to the stationary contact 44 and from it to the conductor 35 connecting the terminals of the near sides of the windings 32 of the first and third of the cylinder and piston units. After traversing these windings 32, the current will pass from the terminals at the opposite sides of the same and to the other terminal of the generator 50, by way of the conductor 36 and the lead 51. Current from the distributing contact 43, in its sequential order of operation, will pass from it to the stationary contact 45 and the conductor 37 to the terminals of the near sides of the windings 32 of the second and fourth of the cylinder and piston units and, after traversing these windings 32, will pass from the other terminals thereof to the conductor 38 and by way of the lead 51 to the other terminal of the generator 50. By letting the control switches 59 and 64 remain on closed circuit, the starting motor 53 may be continuously operated to compensate for any overload that may be impressed on the crank-shaft 25, or that may be due to power losses in the instrumentalities and mechanisms. With the stated energizing of the pairs of the windings 32, the pistons 21, of the respective cylinder and piston units, will be reciprocated relatively to the cylinders 20 under the influence of the successive magnetic fields produced by the passage of current from the generator 50 through the windings, and the resultant rectilinear motion of the pistons will be translated into rotary motion at the crank-shaft 25, through the medium of the connecting rods 23.

Suitable means is to be provided for lubricating all bearings of the moving parts of the timing and power transmission mechanisms, in accordance with usual practices of this particular art, for example, the bearings 68 and 69, at the upper and lower ends, respectively, of the connecting rods 23, can be lubricated by gravity from the tops of the pistons 21, each of which being provided with an axial duct 70 that opens into the recess 22 immediately above the bearing 68 of a wrist-pin 24. This bearing 68 will be provided with a longitudinal groove or channel 71 in its top side and several passages connecting it with the bore of the bearing, so that a fluid lubricant, introduced to the axial duct 70, will pass from its lower end and be received in the channel 71 for distribution to and along the length of the wrist-pin 23. The lubricant will be fed to the axial duct 70 from oil-cups or the like 72 carried on the top of each of the pistons 21. From the bearings 68, the lubricant will be conveyed to the bearings 69 by an axial duct 73 provided in each of the connecting rods 23, the lower end of the duct opening into the bore of a bearing 69 for distribution over the surface of the engaged crank-pin 26.

It will be understood that, while the generators 50 and 63 have been described as actual electrical power producers, they may be faked or simulated and the current demand of the starting motor 53 and of the solenoid windings 32 satisfied by the battery 58, in which case, the terminals of the latter will be connected to the circuit of the timing mechanism after the manner of the terminals of the generator 50. Also, the storage battery 58 may be readily replaced by a dry cell, or a battery of such cells, and, if but one cell is employed, it can be housed within the lower casing part 13, if desired, in lieu of being supported from the bracket 60.

Having thus fully described the invention, it will be apparent that a power plant has been provided which has the advantage of being installable for power purposes where the use of power derived direct from electrical sources would not be feasible or practical, and also, it is to be understood that, while a preferred embodiment of the same has been disclosed herein, various changes in minor details of construction and arrangement of parts, mechanisms, and instrumentalities, may be resorted to, without departing from the spirit of the invention or its scope as claimed.

What I claim is:

An electric engine including a base, an elongated hollow casing mounted on said base, the top wall of said casing being flat and having a plurality of openings disposed in line lengthwise thereof, a crank shaft extending lengthwise through the casing, a solenoidal unit including a vertically movable core mounted on said top wall in axial alinement with each of said openings, a connection between each of the movable cores and said crank shaft, the several solenoidal units each comprising a base plate individually secured on the flat top wall of the casing and having an opening in line with a respective opening in said top wall, a vertical open ended cylinder having its lower end secured within the opening in said base plate, and a winding encircled about said cylinder and adapted for periodic energization from a source of current.

ANTHONY MORCH.